United States Patent [19]

Carey et al.

[11] Patent Number: 5,002,998

[45] Date of Patent: Mar. 26, 1991

[54] AQUEOUS COATING COMPOSITIONS

[75] Inventors: John G. Carey, Warrington, England; Gerardus C. Overbeek, Sprang-Capelle, Netherlands; Martinus P. J. Heuts, Chester, England; Yvonne W. Smak, Nieuwegein, Netherlands

[73] Assignees: Imperial Chemical Industries PLC, London, England; ICI Resins B.V., Waalwijk, Netherlands

[21] Appl. No.: 501,084

[22] Filed: Mar. 29, 1990

[30] Foreign Application Priority Data

Mar. 29, 1989 [GB] United Kingdom ................ 8907106
Feb. 2, 1990 [GB] United Kingdom ................ 9002394

[51] Int. Cl.$^5$ .............................................. C08L 39/00
[52] U.S. Cl. .................................. 524/555; 525/329.9; 525/379; 525/453

[58] Field of Search ...................... 524/555; 525/329.9, 525/329.7, 379, 453

[56] References Cited

U.S. PATENT DOCUMENTS

| 4,016,122 | 4/1977 | Matsuda et al. | 524/591 |
| 4,184,989 | 1/1980 | Flakus et al. | 524/591 |
| 4,427,804 | 1/1984 | Tortorello et al. | 524/501 |
| 4,861,825 | 8/1989 | Ernst et al. | 524/839 |

Primary Examiner—Joseph L. Schofer
Assistant Examiner—Jeffrey T. Smith
Attorney, Agent, or Firm—Cushman, Darby & Cushman

[57] ABSTRACT

An aqueous selfcrosslinkable coating composition which comprises an aqueous dispersion of at least one polymer having chain-pendant amine groups and certain selected non-polymeric ketone-containing compounds, particularly acetoacetates and acetoacetamides, whereby selfcrosslinking is effected, often at ambient or low temperatures, during and/or after film formation.

14 Claims, No Drawings

AQUEOUS COATING COMPOSITIONS

This invention relates to selfcrosslinkable aqueous coating compositions containing polymers having chain-pendant amine groups and certain ketone-containing compounds.

The provision of polymeric film coatings on a variety of substrates, usually for protective or adhesive purposes, is a well established field of technology. It is well known to improve the performance of such coatings by causing them to become crosslinked during and/or after film formation from the composition. Aqueous polymer coating compositions for achieving such an objective are well known and a useful refinement has been to employ selfcrosslinkable polymer coating compositions for this purpose.

We have now discovered a new and useful class of selfcrosslinkable coating compositions which comprise polymers having chain-pendant (i.e. lateral) amine functional groups and certain ketone-containing compounds whereby selfcrosslinking is effected, often at ambient or moderately elevated temperatures, during and/or after film formation.

According to the present invention there is provided an aqueous selfcrosslinkable coating composition which composition comprises an aqueous dispersion comprising at least one polymer having chain-pendant amine functional groups and which also comprises at least one non-polymeric compound having at least two ketone groups reactable with the chain-pendant amine groups, each ketone group being part of a sub-grouping of formula:

wherein —X— is an electron withdrawing group, preferably being selected from an ester-linking moeity

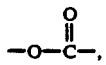

an amide-linking moeity

and a ketonic carbonyl group, and M is —CH$_2$— or

where L is an alkyl, alkylene or alkanetriyl group of at least one carbon atom (or a substituted derivative thereof).

For the purposes of this invention an "aqueous dispersion" means a dispersion (i.e. emulsion, suspension or solution) of the polymer in an aqueous medium of which water is the principal component. Preferably the aqueous dispersion is an aqueous latex of said at least one polymer. Minor amounts of organic liquids may optionally be present.

By an amine functional group is meant a group of formula —NH$_2$ or —NH— which is bonded to a carbon atom or, in the particular context of this specification, a nitrogen atom, and which can take part in selfcrosslinking with an activated ketone group (as defined). Preferably the amine group is a primary amino group (—NH$_2$) which is bonded to a carbon atom of an aliphatic grouping such as an alkyl, alkylene or alkanetriyl group, or forms part of a hydrazino grouping —NHNH$_2$. The amine group may possibly be a secondary amine group (—NH—) but cannot be a tertiary amine group.

(For the sake of clarity in nomenclature we mean by an alkylene group the bivalent radical derived from the removal of any hydrogen atom from an alkyl group and we mean by an alkanetriyl group the tervalent radical derived from the removal of any hydrogen atom from an alkylene radical. The simplest alkylene radical on this definition is methylene —CH$_2$— and the simplest alkanetriyl radical is methine —CH—).

The amino-reactive ketone group as shown in the formula

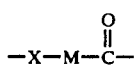

must of course have its right hand bond attached to an alkyl, alkylene, alkanetriyl, or aryl radical in order for it to be considered as a ketone group.

It is also to be understood that when X is an ester- or amide-linking moiety, the left hand bond thereof (as it appears supra in the formula) will be attached to an alkyl, alkylene or akanetriyl group in order for it to be considered as part of an ester or amide group. Likewise, when X is a ketonic carbonyl group, the left hand bond will be attached to an alkyl, alkylene, alkanetriyl or aryl radical.

The use of parenthesese round two of the bonds associated with L is to show that L can be monovalent (alkyl), divalent (alkylene) or trivalent (alkanetriyl).

The selfcrosslinking reaction afforded by the compositions of the invention is believed to occur via the formation of enamine groups (by elimination of water):

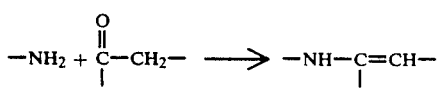

from the amine and activated ketone functionalities (although we do not wish to be held to this mechanism). Such crosslinking will take place during and/or after film formation (on removal of the aqueous carrier phase) when the composition has been applied to a substrate. However, it is to be understood that in at least some cases a certain degree of precrosslinking may take place within the aqueous composition on storage (i.e. before it has been applied to a substrate) but this should not detract from performance and in some cases may even be advantageous.

It is preferred that the composition of the invention contains amine functional and ketone functional groups in a ratio of amine to ketone groups which is within the range of 1:20 to 20:1, more preferably 1:10 to 10:1.

The said at least one polymer bearing lateral amine groups can be an addition polymer derived from one or more olefinically unsaturated monomers; such a polymer is hereinafter termed an "olefinic polymer" for convenience.

An olefinic polymer bearing chain-pendant (lateral) amine functionality is preferably a copolymer formed by first preparing, using a free-radical polymerisation process, a precursor copolymer comprising polymerised units of at least one olefinically unsaturated monomer having an amine precursor group(s) (i.e. a group which may be subsequently reacted to provide a pendant amine group) and at least one other olefinically unsaturated monomer (i.e. a monomer which does not provide an amine precursor group) , and subsequently reacting at least a proportion of the amine precursor groups to provide chain-pendant amine functional groups.

The chain-pendant amine functionality can, if desired, be introduced into the olefinic polymer by an immination reaction involving the carboxyl (or carboxylate salt) groups of a precursor polymer and an added aziridine compound. The aziridine compound is commonly referred to as an alkylene imine and preferably has the formula

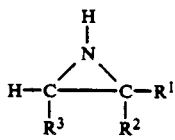

where $R^1$ and $R^2$ which may be the same or different are selected from hydrogen, benzyl, aryl, and alkyl of 1 to 5 carbon atoms; and where $R^3$ is hydrogen or alkyl of 1 to 5 carbon atoms. More preferably $R^1$ is hydrogen, $R^2$ is hydrogen or alkyl of 1 to 5 carbon atoms (particularly methyl) and $R^3$ is hydrogen Ethylene imine ($R^1=R^2=R^3=H$) and propylene imine ($R^1=R^3=H$; $R^2=$methyl) are particularly preferred aziridines because of their relatively low cost and ready availability. Corresponding chain-pendant amino ester groups (providing chain-pendant amine functional groups) formed by the immination reaction have the formula

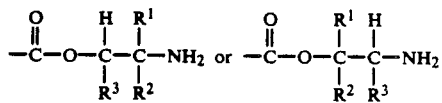

where $R^1$, $R^2$ and $R^3$ are as defined above.

The amount of alkylene imine used should be sufficient to imminate the desired proportion of the carboxyl groups to aminoalkyl ester groups. Preferably the amount used should be sufficient to imminate about 5% to 95%, preferably 20% to 80%, of the carboxyl groups on the precursor polymer. The immination technique is in itself well-known and may be performed by techniques known to the art.

Monomers which can be used to provide carboxyl precursor groups in the precursor polymer are particularly α,β-monoolefinically unsaturated monocarboxylic acids and/or dicarboxylic acids, mostly of 3 to 6 carbon atoms, especially acrylic acid, methacrylic acid, beta-carboxyethylacrylate, fumaric acid and itaconic acid.

Examples of olefinically unsaturated monomers which do not provide amine functional groups (or precursors thereof) which may be mentioned include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), heterocyclic vinyl compounds, alkyl esters of monolefinically unsaturated dicarboxylic acids (such as di-n-butyl maleate and di-n-butyl fumarate) and, in particular, esters of acrylic acid and methacrylic acid of formula

where $R^4$ is H or methyl and $R^5$ is alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl, methacrylate, n-propyl acrylate and n-propyl methacrylate.

The polymer bearing lateral amine groups can also be a condensation polymer; examples of such polymers include polyurethane polymers (in particular), polyester polymers, and polyepoxide polymers. The basic techniques used for condensation polymerisation processes are well known and a detailed discussion is not required here.

Any suitable technique may be adopted for preparing a condensation polymer bearing lateral amino groups. For example, as is well known, polyurethane polymers are generally made by reacting an organic polyisocyanate(s) with an organic compound(s) containing at least two isocyanate-reactive groups, particularly a macropolyol with the optional inclusion of a low molecular weight organic polyol. A favoured route to their formation involves the formation of an isocyanate-terminated prepolymer followed by chain extension with an active-hydrogen-containing compound. Lateral hydrazino-type amino groups may be incorporated in the polyurethane polymer by employing as a reactant in the prepolymer formation an isocyanate-reactive compound (normally bearing at least two isocyanate-reactive groups) which also has an hydrazine-precursor group which becomes chain-pendant after polymer formation and these lateral groups may subsequently (at an appropriate stage) be converted to groups providing lateral hydrazino groups.

For example, lateral hydrazino groups may be incorporated into polyurethane polymers by the use of an isocyanate-reactive compound (having at least one and preferably at least two isocyanate-reactive groups) having a monoaldehyde or monoketone-blocked hydrazino group, by which is meant a compound in which the hydrazine functionality has been blocked by reaction with a monoaldehyde or a monoketone (preferably of boiling point 30°-200° C., such as acetone or methyl ethyl ketone) to form a hydrazone structure. This expedient is employed because a hydrazine functionality will otherwise react during the prepolymer preparation and so be completely removed. The blocked hydrazine functionality is however not labile under anhydrous conditions and is moreover sufficiently stable at pH above 7 (preferably above 8) even in an aqueous medium, such alkaline conditions preferably being achieved by the presence of a volatile organic amine such as triethylamine. Consequently the chain extension step may be performed with the polyurethane in aqueous dispersion and the chain extending agent(s) in the aqueous phase, with the pH above 7 (preferably above 8), without the blocked hydrazine functionality becoming significantly affected or removed. Subsequent acidification will cause regeneration of the hydrazine functionality (which is then available for crosslinking purposes).

Examples of isocyanate-reactive monoaldehyde or monoketone-blocked hydrazine compounds include
gamma hydroxy butyric hydrazide blocked with a ketone or aldehyde of boiling point 30° to 200° C. e.g.

HOCH$_2$CH$_2$CH$_2$C(O)NHN=C(CH$_3$)$_2$ the diol of formula (OCH$_2$CH$_2$)$_2$NCH$_2$CH$_2$C(O)NHN=C(CH$_3$)$_2$ formed by reacting ethyl acrylate with diethanolamine followed by reacting the resulting compound with hydrazine (to form the hydrazide) and blocking with acetone gamma hydroxy butyric hydrazide blocked with a ketone or aldehyde of boiling point 30° to 200° C. (e.g. acetone) selectivity reacted with the 4-substituent isocyanate group of 2,4-toluene diisocyanate after which the reaction product has been selectively reacted with the amino group of diethanolamine, a typical compound of this type having the formula

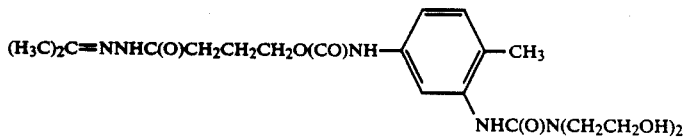

semicarbazido ethyl methacylate as described in Example 3 of U.S Pat. No. 4521460 blocked with a ketone-/aldehyde of boiling point 30° to 200° C. and reacted with ethanolamine.

Lateral hydrazino-type amino groups may also be incorporated into polyurethane polymers during the chain-extension step by the use of active-hydrogen chain extending material which is or which includes a compound having a hydrazino group and which provides hydrazine functionality pendant to the polyurethane chain. Examples of such compounds include e.g. diamino hydrazide of formula

as described in U.S. Pat. No. 4 598 121 where R$^6$ is an alkylene group of 2 to 15 carbon atoms or a cycloalkylene or arylene group of 6 to 15 carbon atoms.

The amine-containing polymers employed in the compositions of the invention preferably contain $5 \times 10^{-3}$ to $100 \times 10^{-3}$ moles of amine groups per 100 g of polymer, more preferably $10 \times 10^{-3}$ to $80 \times 10^{-3}$ moles of amine groups per 100 g of polymer.

The amine-containing polymers for use in the composition of the invention preferably have a weight average molecular weight within the range 5,000 to 6,000,000 (more preferably 100,000 to 2,000,000).

Examples of ketone-containing non-polymeric compounds for use in the compositions of the invention particularly include acetoacetate esters, acetoacetate amides, and 1,3 diketones wherein the relevant subgroupings are respectively of formula:

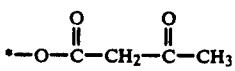

-continued

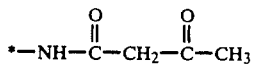

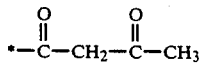

(* bonded to an alkylene or alkanetriyl group)

An example of such a ketone-containing compound is the acetoacete ester of formula:

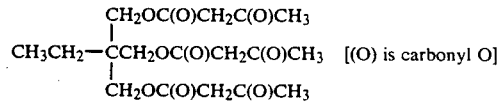   [(O) is carbonyl O]

This compound may be readily prepared from the reaction of trimethylol propane (TMPA)

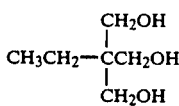

with diketene. Ethoxylated and propoxylated TMPA may also serve as precursors for reaction with diketene to produce acetoacetate esters, and an example of such an ester has the formula:

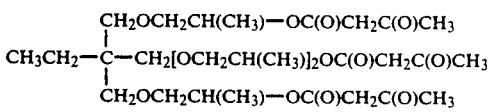

Note that the above product contains four propylene oxide groups.

As an example of an acetoacetamide there may be mentioned the reaction product of diketene with the commercially available propyleneoxyamino compound Jeffamine 403 (Texaco), such an acetoacetamide having the formula:

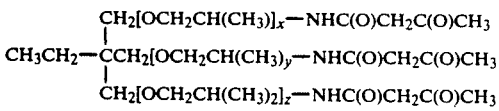

where x+y+z=5 to 6.

It may in fact be useful for such acetoacetate esters and amides to contain at least two propylene oxide or ethylene oxide groups.

As examples of ketone-containing non-polymeric compounds where the ketone is present in the subgrouping

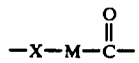

and where X is itself a ketone group, there may be mentioned as examples 1,3 diketones (as mentioned above) 1,4 diketones and 1,5-diketones, i.e. compounds having two ketone groups bridged by an alkylene group (or substituted alkylene group) or an alkanetriyl group (or substituted alkane triyl group) of 1 or more carbon atoms (particularly 1, 2 or 3 carbon atoms). As examples of such materials there may be mentioned compounds of formula:

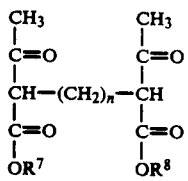

where $R^7$ and $R^8$, which may be the same or different are selected from alkyl groups of 1 to 5 carbon atoms (preferably methyl and ethyl) and n is zero or an integer of 1 to 5 (preferably 0, 1 and 2).

The composition of the invention may optionally include at least one other polymer (i.e. a polymer other than an amine-functional polymer as described above). This is usually a free radical addition polymer, formed by the free radical addition polymerisation of at least one olefinically unsaturated monomer. However, condensation polymers may also be used. The different polymers may be present in the composition in simple admixture but can also be present in such a way that there is at least a proportion of chemical bonding between the polymers to form (in effect) at least a proportion of grafting between the polymers.

The aqueous compositions of the invention may be advantageously employed as coating compositions (e.g. protective or adhesive coating compositions), since depending on their chemical constitution, they can yield coatings of excellent solvent, water and stain resistance. For this purpose they may be used "as is" or further diluted with water and/or organic solvents, or they may be supplied in more concentrated form by evaporation of water and/or organic components of the liquid medium. As coating compositions, they may be applied to a variety of substrates including wood, metals, glass, cloth, leather, paper, plastics, foam and the like, by any conventional method including brushing, dipping, flow coating, spraying, and the like. The liquid carrier phase is removed (drying) to form a film coating. If appropriate the resulting film coating can be heated at moderately elevated temperatures to properly develop the crosslinking. The compositions may contain other conventional ingredients including organic solvents, pigments, dyes, emulsifiers, surfactants, thickeners, heat stabilisers, levelling agents, wetting agents, anti-cratering agents, fillers, sedimentation inhibitors, fire retardants, UV absorbers, antioxidants and the like introduced at any stage of the production process or subsequently.

The compositions, which are in the form of aqueous dispersions, suitably have polymer solids contents of from about 20 to 65% by weight, preferably from about 30 to 60% by weight.

The present invention is now illustrated by the following examples. Unless otherwise specified, all parts and percentages are on a weight basis.

In these examples, the double rub test assesses the solvent resistance of a film and is effected by rubbing the film with a rag soaked with the solvent until the film fails (i.e. is showing through) or until 200 double rubs is achieved before failure, when the film is rated as follows:

200 (0/5) : film failed
200 (1/5) : film is severely affected
200 (2/5) : film is affected
200 (3/5) : film is slightly affected
200 (4/5) : film is hardly affected
200 (5/5) : film is unaffected

EXAMPLES 1 AND 2

The acetoacetate triester of trimethylol propane (TMPA) was prepared as follows. Freshly distilled diketene (153.0 g) in dichloromethane (200 ml) was added dropwise to a stirred suspension of TMPA (80.4 g) in dichloromethane (250 ml) containing 0.6 g of p-dimethylaminopyridine as catalyst. The rate of addition was such as to maintain a temperature of between 25° to 35° C. The resulting solution was maintained at 30° C. for a further 3 hours and then extracted with 2 N HCl saturated with sodium chloride. The solvent layer was separated and dried and the solvent removed under reduced pressure to afford the acetoacetate triester (230 g). $H^1$NMR spectroscopy showed the product to contain >98% of acetoacetyl substitution.

The acetoacetate triamide derived from Jeffamine 403 was prepared as follows. (Jeffamine 403 is a triamine based on 5-6 moles of propylene oxide per 1 mole of TMPA. It has molecular weight of ca 440 and an amine equivalent weight of 6.4 milliequivalents/g). To a stirred suspension of Jeffamine 403 (175 g) in methylene chloride (300 ml) was added dropwise a solution of diketene (94 g) in methylene chloride (100 ml). The reaction was spontaneously exothermic, the addition being at such a rate as to maintain the temperature below 35° C. After 90% of the diketene had been added, dimethylaminopyridine (0.3 g) was added to catalyse complete reaction of the residual diketene with hydroxyl impurities contained in the Jeffamine 403. (This latter stage is, in fact, optional). After the addition had been completed, the reaction medium was allowed to stand for 4 hours, then washed with 2 N HCl saturated with sodium chloride, dried, and the solvent finally evaporated to afford the pale yellow viscous acetoacetamide (253 g).

Two compositions according to the invention (Examples 1 and 2) were prepared by the addition to a styrene/acrylic precursor polymer latex containing 0.0625 moles/100 g of lateral amine groups (based on polymer solids; prepared by immination of a carboxyl-containing precursor polymer) of an equivalent weight of each of the acetoester and amide compounds described supra. (Polymer solids content of the compositions: ca. 45%).

Films were cast from both compositions (ambient temperature drying) and tested after keeping for 3 days at ambient temperature. They were found to have improved solvent and water resistance in comparison to control film cast from latex not containing the acetoester or amide compounds. Thus the methyl ethyl ketone (MEK) double rub resistance of the films derived from the compositions according to the invention corresponded to 200 (3/5) double rubs, while the MEK double rub resistance of the control film corresponded to 65 double rubs. The improved water resistance was manifested by contacting the films with water for 16 hours; those derived from the compositions according to the invention showed little or no blushing as compared to the control film.

No deterioration in performance was observed (the same values being obtained) when the compositions according to the invention were again tested after being stored for 5 weeks and recast.

EXAMPLE 3

An aqueous latex dispersion of a polyurethane polymer having lateral hydrazino groups was prepared as follows.

A urethane prepolymer was first prepared by charging a 2 liter flask (under nitrogen) with the following materials.
240.00 g of 4,4'-dicyclohexyl diisocyanate
28.80 g of dimethylolpropanoic acid
2.47 g of 1,4 cyclohexyldimethanol
208.73 g of polytetrahydrofuran polyol (Terathane 2000) with an OH number of 56.7
119.93 g of N-methylpyrrolidone (NMP)
0.07 g of dibutyltindilaurate catalyst (Ferro 820).
The reaction mixture was held at 90° C. until the NCO-content was below 6.4%. The mixture was then cooled down to 60° C. At this temperature 21.32 g of triethylamine were added. This mixture was dispersed in water. After dispersion in water, chain-extension was effected by the addition of 114.35 g of the diamino hydrazide compound of formula

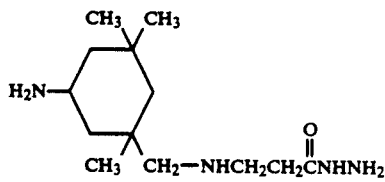

(made from the reaction of isophorone diamine with ethyl acrylate followed by reaction with hydrazine hydrate; prepared as per Example 1 of U.S Pat. No.4598121) thereby incorporating lateral hydrazino functional groups into the polymer as a result of the chain-extension step. The resulting dispersion, denoted hereinafter by A, had a solids content of 35%.

A composition according to the invention (Example 3) was prepared by adding 5.49 g of a solution, containing 5 g the acetoacetate triester of trimethylol propane and 45 g of N-methyl pyrollidone, to 50 g of the dispersion A followed by the addition of 1.66 g of wetting agent (Fluowet SB).

For comparison purposes a composition based on dispersion A was made by adding to this dispersion an equivalent amount of N-methylpyrrolidone (NMP) and Fluowet SB.

The performance of these compositions was tested by casting films from them on glass (80 μm wet thickness). The films were dried for at least one hour at ambient temperature and aged for 16 hours at 70° C. The solvent resistances of the films were as follows.

| Composition | No. of Ethanol double rubs | No. of NMP double rubs | No. of MEK double rubs |
| --- | --- | --- | --- |
| A | 55 | 85 | 200 (2/5) |
| Ex. 3 | 200 (4/5) | 200 (0/5) | 200 (4/5) |

It will be noted that a dramatic improvement in solvent resistance was achieved in the films made from the composition according to the invention in comparison to the films made from the comparative composition.

We claim:

1. Aqueous selfcrosslinkable coating composition which composition comprises an aqueous dispersion comprising at least one polymer having chain-pendant amine functional groups and which also comprises at least one non-polymeric compound having at least two ketone groups reactable with the chain-pendant amine groups, each ketone group being part of a sub-grouping of formula:

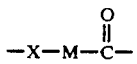

wherein —X— is an electron withdrawing group and —M— is —CH$_2$—or

where L is an alkyl, alkylene, or alkanetriyl group of at least one carbon atom, or a substituted derivative thereof.

2. Composition according to claim 1 wherein X is selected from
an ester-linking moiety

an amide-linking moiety

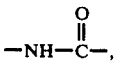

and
a ketonic carbonyl group

3. Composition according to either claim 1 or claim 2 which composition comprises an aqueous latex of said at least one polymer.

4. Composition according to any one of the preceding claims wherein said chain-pendant amine-functional group is a primary amino group (—NH$_2$) which is bonded to a carbon atom of an aliphatic grouping or is part of a hydrazino grouping (—NHNH$_2$).

5. Composition according any one of the preceding claims wherein the composition contains amine-functional groups and ketone functional groups in a ratio which is within the range of from 1:20 to 20:1.

6. Composition according to any one of the preceding claims wherein said at least one polymer is an addition polymer derived from one or more olefinically unsaturated monomers.

7. Composition according to claim 6 wherein said polymer of the composition is a copolymer formed by first preparing, using a free-radical addition polymerisation process, a precursor copolymer comprising polymerised units of at least one olefinically unsaturated monomer having at least one amine precursor group and at least one other olefinically unsaturated monomer, and subsequently reacting at least a proportion of the amine precursor groups to provide chain-pendant amine functional groups.

8. Composition according to claim 7 wherein the chain-pendant amine functional groups of said polymer have been introduced into the polymer by an immination reaction involving carboxyl groups as amine-precursor groups and an added aziridine compound.

9. Composition according to any one of claims 1 to 5 wherein said at least one polymer is a condensation polymer.

10. Composition according to claim 9 wherein said at least one polymer is a polyurethane polymer.

11. Composition according to claim 10 wherein said polyurethane polymer has been prepared by forming an isocyanate-terminated prepolymer from a reaction comprising at least one organic polyisocyanate and at least one organic compound containing at least two isocyanate-reactive groups and chain-extending the prepolymer by reaction with at least one active-hydrogen-containing compound, and wherein said lateral amino functional groups have been incorporated into the polymer either (a) by employing as a reactant in the prepolymer formation an isocyanate-reactive compound which also has a hydrazine-precursor group which becomes chain-pendant after polymer formation and subsequently converting the resulting chain-pendant precursor groups to chain-pendant hydrazino groups, or (b) by employing during the chain-extension stage an active-hydrogen chain-extending material which is or which includes a compound having a hydrazino group and which provides hydrazino groups pendant to the polymer chain.

12. Composition according to any one of the preceding claims wherein the ketone-containing non-polymeric compound of the composition is selected from acetoacetate esters, acetoacetate amides, and 1,3 diketones wherein the relevant sub-groupings are respectively of formula:

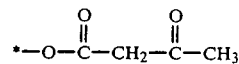

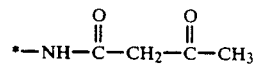

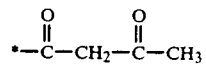

where the asterisk denotes bonding to an alkylene or akanetriyl group.

13. Composition according to any one of claims 1 to 12 wherein the keto-containing non-polymeric compound is selected from 1,4-diketones and 1,5-diketones.

14. A film coating derived from a composition according to any one of the preceding claims.

* * * * *